US009847992B2

(12) United States Patent
Zaw et al.

(10) Patent No.: US 9,847,992 B2
(45) Date of Patent: Dec. 19, 2017

(54) END-TO-END CERTIFICATE PINNING

(71) Applicant: Verizon Digital Media Services Inc., Playa Vista, CA (US)

(72) Inventors: Tin Zaw, Los Angeles, CA (US); Reed Morrison, Torrance, CA (US); Robert J. Peters, Santa Monica, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 126 days.

(21) Appl. No.: 14/831,772

(22) Filed: Aug. 20, 2015

(65) Prior Publication Data

US 2017/0054708 A1     Feb. 23, 2017

(51) Int. Cl.
    *H04L 29/06*     (2006.01)
(52) U.S. Cl.
    CPC ...... *H04L 63/0823* (2013.01); *H04L 63/0442* (2013.01); *H04L 63/12* (2013.01); *H04L 63/1441* (2013.01)
(58) Field of Classification Search
    CPC .................. H04L 63/0823; H04L 63/0442
    See application file for complete search history.

(56) References Cited

U.S. PATENT DOCUMENTS

| | | | | |
|---|---|---|---|---|
| 2002/0027992 A1* | 3/2002 | Matsuyama | ............ | G06F 21/10 380/231 |
| 2007/0168670 A1* | 7/2007 | Dean | ............ | G06F 21/54 713/176 |
| 2008/0263644 A1* | 10/2008 | Grinstein | ............ | G06F 21/445 726/6 |
| 2011/0314152 A1* | 12/2011 | Loder | ............ | G06F 17/30887 709/225 |
| 2013/0054962 A1* | 2/2013 | Chawla | ............ | H04L 9/321 713/156 |
| 2013/0267202 A1* | 10/2013 | Palanigounder | ..... | H04L 12/1868 455/411 |
| 2013/0326215 A1* | 12/2013 | Leggette | ............ | G06F 17/3023 713/156 |
| 2014/0075185 A1* | 3/2014 | Dragomir | ............ | H04L 9/3268 713/156 |
| 2015/0170072 A1* | 6/2015 | Grant | ............ | G06Q 10/067 705/7.36 |

(Continued)

*Primary Examiner* — Kambiz Zand
*Assistant Examiner* — Tongoc Tran
(74) *Attorney, Agent, or Firm* — Los Angeles Patent Group; Arman Katiraei

(57) ABSTRACT

Some embodiments implement end-to-end certificate pinning for content intake from various content providers and for content distribution to various end users. To ensure secure retrieval of content provider content, the content distributor pins the content provider to one or more certificate authorities. Accordingly, the content distributor only retrieves content from a sender identified as the content provider when the sender identity is verified with a certificate issued by a certificate authority pinned to the content provider. To ensure secure delivery of content from the content distributor to an end user, the content distributor modifies the pinset of the user browser to pin the content distributor to one or more certificate authorities. Thereafter, the user browser only accepts content from a sender identified as the content distributor when the sender identity is verified with a certificate issued by a certificate authority pinned to the content distributor in the browser pinset.

19 Claims, 9 Drawing Sheets

(56) References Cited

U.S. PATENT DOCUMENTS

| | | | |
|---|---|---|---|
| 2016/0072904 A1* | 3/2016 | Asnis | H04L 43/0876 709/224 |
| 2016/0094575 A1* | 3/2016 | Shekyan | H04L 63/1433 726/25 |
| 2016/0182473 A1* | 6/2016 | Cignetti | H04L 63/0428 713/171 |
| 2016/0248746 A1* | 8/2016 | James | H04L 61/1511 |
| 2016/0359843 A1* | 12/2016 | Candelore | H04L 63/0823 |

\* cited by examiner

END-TO-END CERTIFICATE PINNING

BACKGROUND ART

Specialized content distributors deliver much of the digital content that is consumed over the Internet. Content providers create the content and offload it to the content distributor for large scale delivery to end users located throughout the world. The content distributor manages the infrastructure and capacity needed to deliver different content provider content, thereby allowing the content providers to focus on content creation.

A content delivery network (CDN) is an example of a content distributor that delivers content on behalf of different content providers. The CDN provides additional benefits including optimizing and securing content delivery. By distributing the content of several content providers from the same infrastructure, CDNs and other such content distributors, become more frequent targets of network based attacks. Successful attacks on a CDN could have wide spread impact affecting multiple content providers as well as the numerous end users that receive content from the CDN.

One such attack involves fooling the CDN or content distributor with seemingly valid security certificates in order to make the CDN think that the attacker is a particular content provider CDN customer that has content offloaded to the CDN for delivery. In fraudulently emulating the particular content provider, the attacker replaces the actual customer's original content on the CDN with fraudulent content. Thereafter, whenever the customer's content is requested from the CDN, the CDN unknowingly distributes the fraudulent content instead.

FIG. 1 illustrates how such an attack can be carried out. The attack is initiated when a user 110 submits (at 170) a request for content to a CDN or content distribution server 120 and the server 120 does not have a locally cached copy of the requested content. The server 120 attempts to establish a secure connection with and forward (at 175) the request to a content provider 130 originating the requested content, in order to retrieve a copy of the valid content.

The connection or forwarded request is intercepted by a third party 140. In this figure, the third party 140 uses a compromised or misconfigured router 150 to intercept (at 180) or redirect the request to the third party 140. The router 150 could also be a firewall. The third party 140 also uses a compromised certificate authority to issue or sign a seemingly valid certificate 160 fraudulently verifying the third party 140 identity as the content provider 130.

In response to the intercepted request, the third party 140 sends (at 185) the seemingly valid certificate 160 with the fraudulent content to the server 120, thereby fooling the CDN or content distributor into thinking it is receiving valid content from the content provider 130. The server 120 then serves (at 190) the fraudulent content to the user 110 in response to the user request. The server 120 may also cache a copy of the fraudulent content to provide to other users that subsequently request the content provider's 130 content from the server 120. This would then propagate the fraudulent content to an even greater number of users.

Similar attacks can be used to hijack and replace content passed by the CDN to end users. In such situations, the end users believe they are receiving content from the CDN, when in fact, the content is being provided by a third party that appears to be the CDN by way of fraudulent security certificates.

There is therefore a need to improve CDN security. To verify authenticity of content received by the CDN, there is a need to not only verify the sender's identity with a security certificate, but also the identity of the certificate authority issuing the certificate and assuring the sender's identity. Such verification is also needed for content the CDN sends to end users in order to ensure that the end users are in fact receiving content sent from the CDN and not an intercepting third party.

BRIEF DESCRIPTION OF THE DRAWINGS

A preferred embodiment of methods and systems for end-to-end certificate pinning will now be described, by way of example only, with reference to the accompanying drawings in which.

DETAILED DESCRIPTION

Some embodiments implement end-to-end certificate pinning for content intake from various content providers and also for content distribution to various end users. The end-to-end certificate pinning ensures that the content is not altered by another throughout this retrieval and distribution sequence. The end-to-end certificate pinning combats the potential risk of being presented with fraudulent, but technically valid certificates. In so doing, the provided embodiments mitigate against the risk of a first entity presenting fraudulent credentials and falsely identifying itself as a second entity in order to pass on content that seemingly originates from the second entity.

Figure 1:
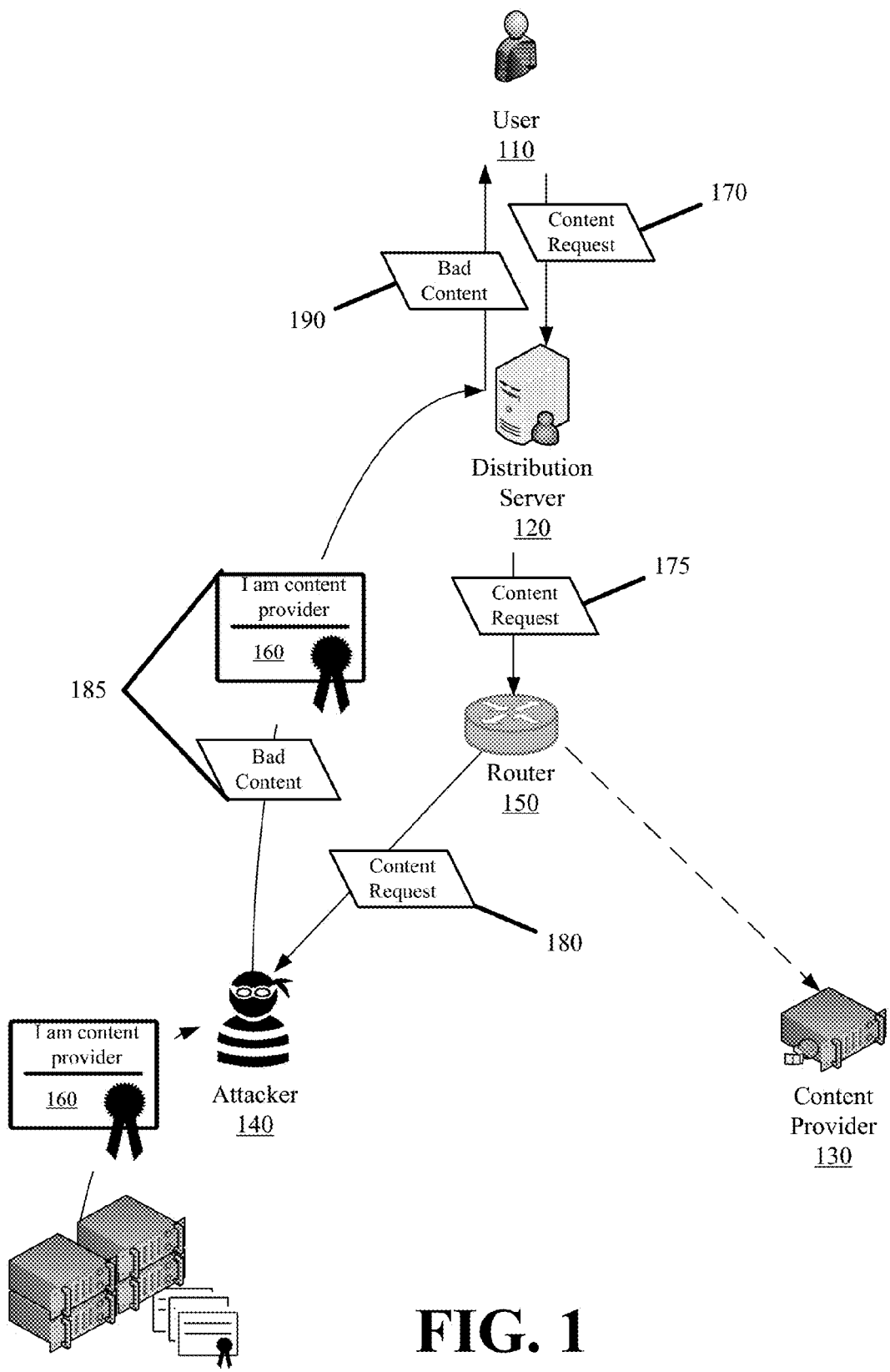
FIG. 1 illustrates how an attacker can use security certificates from a compromised certificate authority to inject and disseminate invalid content using a content distributor.
Figure 2:
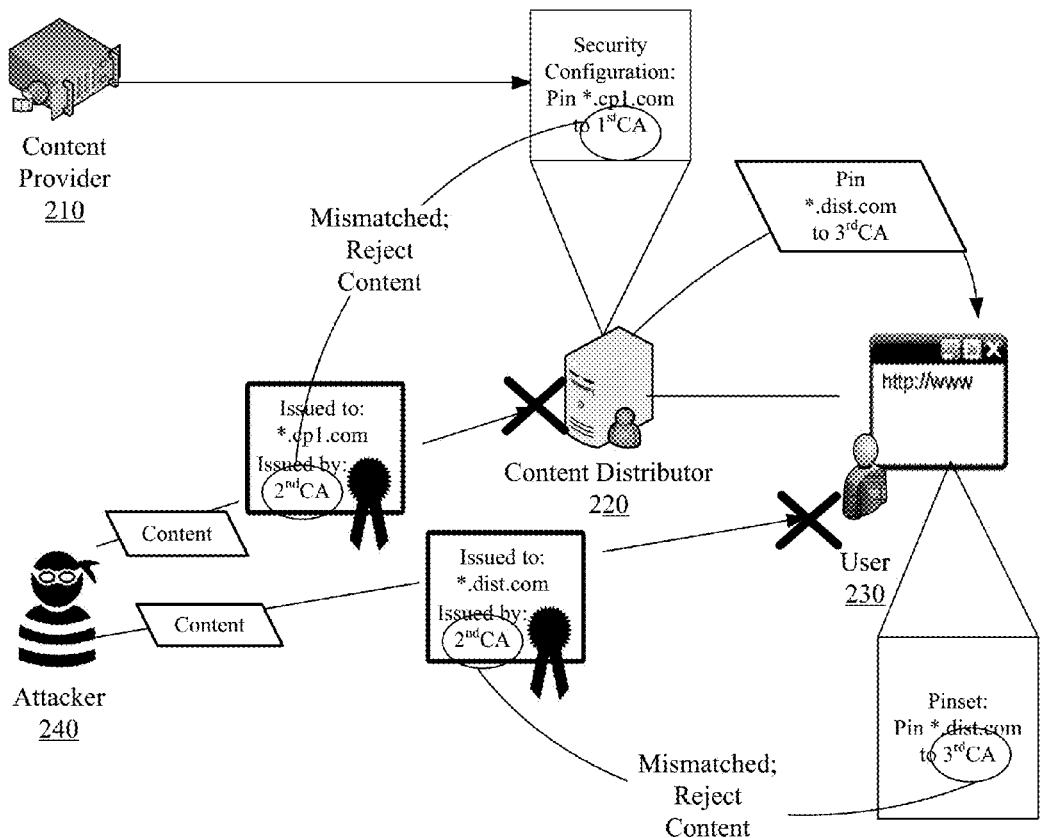
FIG. 2 conceptually illustrates end-to-end pinning in accordance with some embodiments.

FIG. 2 conceptually illustrates end-to-end pinning in accordance with some embodiments. The figure illustrates a content provider 210, a content distributor 220, a user browser 230, and an attacker 240.

To ensure secure retrieval of content provider 210 content, the content distributor 220 pins the content provider to one or more certificate authorities. Accordingly, the content distributor 220 only retrieves content from a sender identified as the content provider 210 when the sender identity is verified with a certificate issued by a certificate authority pinned to the content provider 210.

In this figure, the attacker 240 sends a seeming valid security certificate issued by a second certificate authority to the content distributor 220 with the security certificate fraudulently identifying the attacker 240 as the content provider 210. Since the content distributor 220 has pinned the content provider 210 to the first certificate authority and the attacker 240 provided certificate is signed by the second certificate authority instead of the first certificate authority, the content distributor 220 is able to detect the fraudulent activity and reject the attacker 240 content based on the mismatched certificate authorities To ensure secure delivery of content from the content distributor 220 to the user browser 230, the content distributor modifies the pinset of the user browser 230 to pin the content distributor 220 to one or more certificate authorities. Thereafter, the user browser 230 only accepts content from a sender identified as the content distributor 220 when the sender identity is verified with a certificate issued by a certificate authority pinned to the content distributor 220 in the browser pinset.

Here again in FIG. 2, the attacker 240 sends a seemingly valid security certificate issued by the second certificate authority to the user browser 230 with the security certificate fraudulently identifying the attacker 240 as the content distributor 220. However, the content distributor 220 modified the user browser 230 pinset such that the browser 230 only accepts content from the content distributor 220 when the content distributor's 220 identity is verified with a security certificate issued by the third certificate authority. Since the attacker 220 provided certificate is issued by the second certificate provider instead of the third certificate authority, the user browser 230 rejects the content on the basis of the mismatch certificate authorities.

The end-to-end certificate pinning embodiments disclosed herein apply to and can be implemented by any content distributor. Content distributors include content delivery networks (CDNs), hosting sites, cloud service providers, and any other network accessible machine that receives content from a first party and delivers that content to other parties on behalf of the first party.

Certificate pinning is performed for data received or communicated over a secure connection or secure protocol, such as Hypertext Transfer Protocol over Secure Socket Layer (HTTPS) or HTTP Secure. The certificate pinning embodiments offered herein are applicable to X.509 security certificates, public key infrastructure (PKI) security certificates, and security certificates issued by certificate authorities such as DigiCert, Verisign, Comodo, GoDaddy, Entrust, and the like. As will be described below, the certificate pinning embodiments are also applicable to self-signed certificates or certificates issued without a certificate authority.

In accordance with some embodiments, certificate pinning is performed at a content distribution server using one or more authority verification identifiers. Content providers sending content to the content distributor are pinned to one or more authority verification identifiers and the content distributor redistributing the content provider content to end users is pinned to one or more authority verification identifiers.

The content provider authority verification identifiers are configured on the content distribution server when the content providers register with the content distribution server or configure its content delivery operation. The content distributor authority verification identifiers are configured with web browser and other end user applications or tools used by end users to request and obtain content from the content distributor.

The content provider authority verification identifiers track the certificate authorities that originally issue or sign security certificates for the content providers. Similarly, the content distributor authority verification identifiers track the certificate authorities that originally issue or sign security certificates for the content distributor.

Accordingly, when the content distributor receives content and a security certificate identifying the content as originating from a content provider, the content distributor uses the configured content provider authority verification identifiers to verify that the certificate authority issuing the security certificate received from the content provider is actually the same certificate authority that originally issued the content provider's security certificates. In this manner, the content distributor verifies that the seemingly valid security certificate is not fraudulently issued by a potentially compromised certificate authority. More importantly, the content distributor verifies that it is receiving content from the content provider and not an intermediary fraudulently representing itself as the content provider.

Similarly, in order for an end user to request content from the content distributor, the end user establishes a secure connection with the content distributor. Over the secure connection, the content distributor sends the end user its security certificate along with content requested by the end user. Based on the content distributor authority verification identifier configured in the end user browser, the end user is able to verify that the certificate authority issuing the security certificate received from the content distributor is actually the same certificate authority that originally issued the content provider's security certificates. This verification ensures that the end user receives content from the content distributor and not an intermediary fraudulently representing itself as the content distributor.

In some embodiments, the authority verification identifier is any of the certificate authority name, canonical name, hostname, domain name, Uniform Resource Locator (URL), or Internet Protocol (IP) address. The authority verification identifier can include other identifiers that uniquely identify certificate authorities. Typically, these identifiers are embedded within the security certificate or the packet with which the security certificate is sent.

In some embodiments, the authority verification identifier is a derived value. The authority verification identifier may be derived using a cryptographically secure hash of some feature of the certificate at issue. In some embodiments, the authority verification identifier is derived from a hash of the subject public key information (SPKI) field from the security certificate. Hashing the SPKI is preferred to hashing of just the public key because the SPKI includes public parameters for the public key and also contextual information such as an algorithm or object identifier. Hashing the SPKI allows for certificate rotations with the added assurance of not having to store the certificates on the content distribution server. In other words, the security certificates can be updated and reissued with different extensions and expiration parameters without the need to change the authority verification identifier derived from the SPKI hash. Nevertheless, some embodiments can produce the authority verification identifier from a hash of the security certificate or the public key including any of the RSAPublicKey or DSAPublicKey.

Some embodiments perform certificate pinning using only one authority verification identifier. Some other embodiments perform more granular certificate pinning. In some such embodiments, multiple different authority verification identifiers are used in performing certificate pinning.

For example, a combination of the certificate authority name, URL, and SPKI hash can be used to verify that the certificate authority signing a provided security certificate is the certificate authority that originally issued certificates for the identified content provider or content distributors. Having multiple parameters to verify the certificate authority makes it increasingly harder to spoof the actual security certificate.

A content provider customer registers with the content distributor and configures content distribution services thereof. At the very least, the content provider configures what content the content distributor is to deliver on behalf of the content provider. As part of the configuration, the content distributor also sets one or more authority verification identifiers for the content provider.

The content provider authority verification identifier configuration can be done manually with the content provider listing the certificate authorities that the content provider has received certificates from. The listing can include names, canonical names, domain names, URLs, etc.

The content provider authority verification identifier configuration can also be done automatically with the content provider providing the content distributor with its security certificates. The content distributor then parses the certificates in order to extract the authority verification identifiers for that content provider. When the authority verification identifier is a hash of the SPKI, the content distributor either obtains the SPKI from the certificates provided by the content provider or from the certificate authorities identified by name, canonical name, domain name, etc. as a result of a content provider provided listing.

The content distributor pins one or more authority verification identifiers to each content provider customer. In other words, the content distributor associates the one or more authority verification identifiers to the content provider customer. When content is retrieved from a particular content provider, the content distributor obtains the pinned authority verification identifiers for that particular content provider and uses the authority verification identifiers to ensure authenticity of the content being retrieved.

The content distributor may include a database that stores the different pinned authority verification identifiers or certificate authorities to the different content providers. In the context of a CDN, the authority verification identifiers can be stored at each CDN caching server or can be centrally stored and managed at a CDN administrative server or database which the CDN caching servers contact when authority verification identifiers for a particular content provider are needed.

Figure 3:
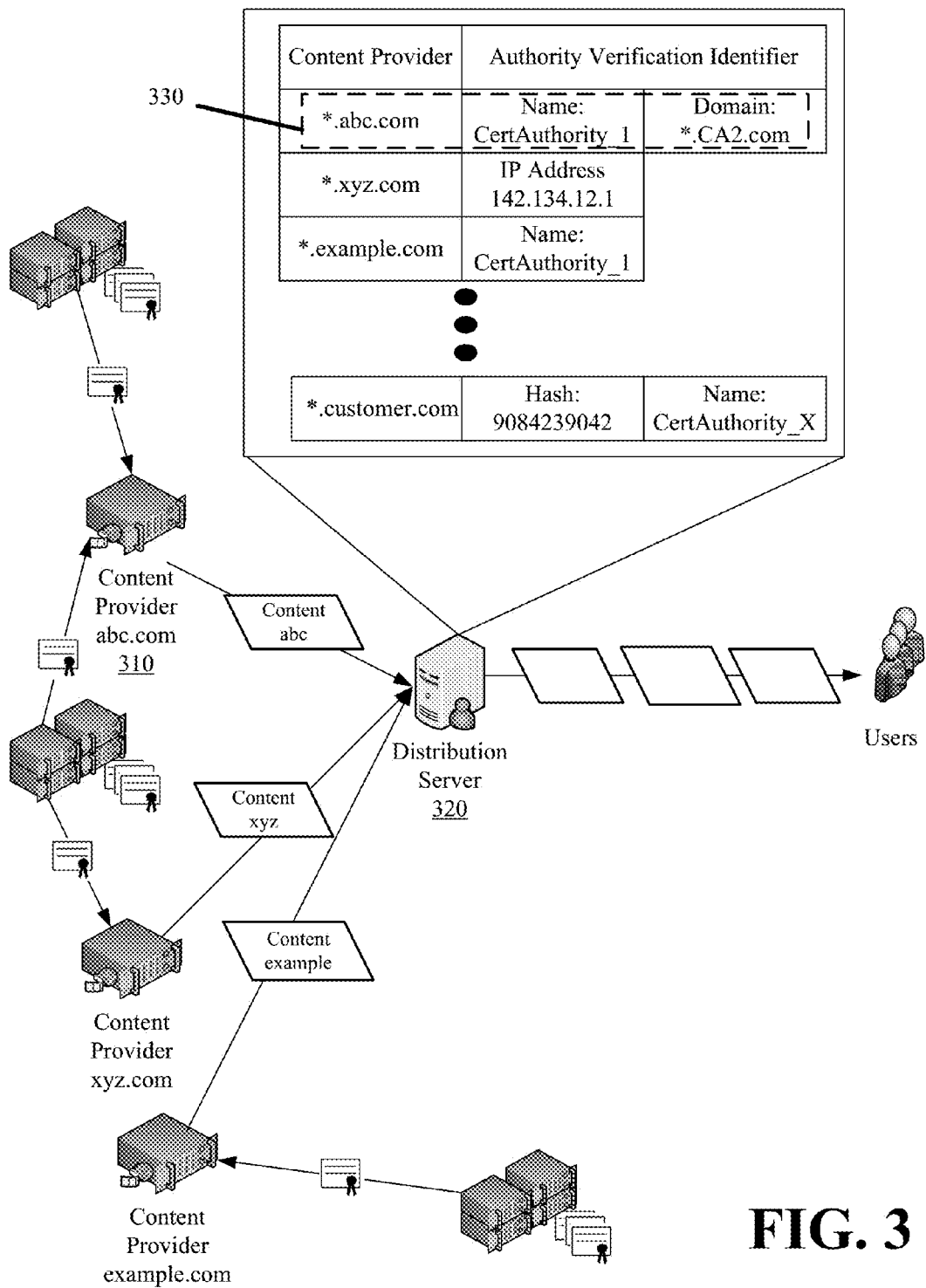
FIG. 3 conceptually illustrates a content distributor storing different authority verification identifiers for different content providers.

FIG. 3 conceptually illustrates a content distributor storing different authority verification identifiers for different content providers. The content distributor selects the correct authority verification identifiers for certificate authority verification based on which content provider the content distribution server retrieves content from. For instance, when receiving content and a security certificate from a party claiming to be content provider 310, the distribution server 320 uses the content provider authority verification identifiers 330 to verify the party's identity by verifying that the provided security certificate is issued by a certificate authority that is pinned to the content provider 310.

Figure 4:
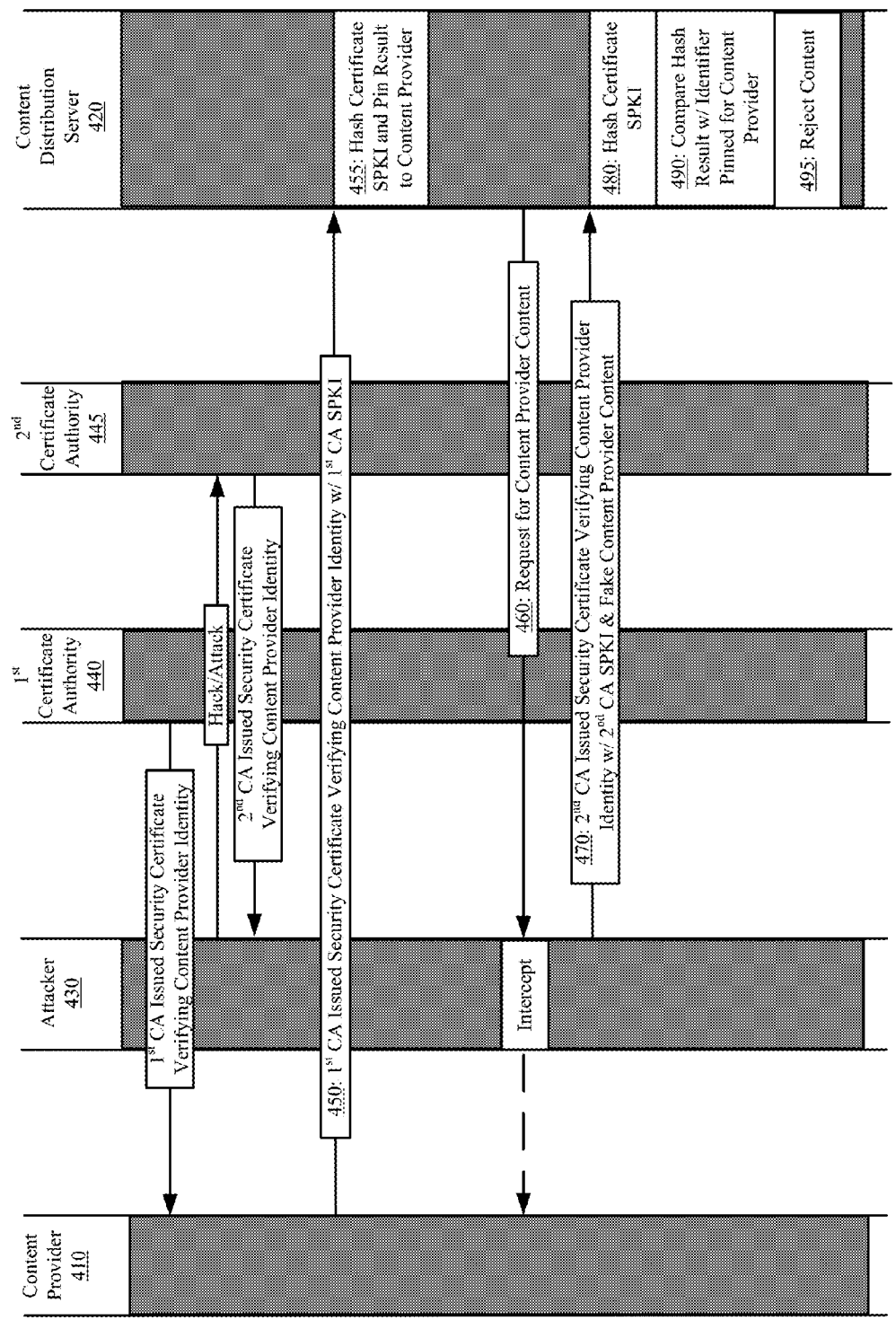
FIG. 4 conceptually illustrates performing certificate pinning using the SPKI as the authority verification identifier in accordance with some embodiments.

FIG. 4 conceptually illustrates performing certificate pinning using the SPKI as the authority verification identifier in accordance with some embodiments. Specifically, this figure illustrates using the SPKI identifier to identify a sender attempting to spoof and fraudulently represent itself as another.

The figure illustrates a content provider 410, a content distribution server 420, an attacker 430, a first certificate authority 440, and a compromised second certificate authority 445. The attacker 430 attempts to spoof and fraudulently represent itself as the content provider 410 by using the compromised certificate authority 445 to issue a security certificate identifying the attacker 430 as the content provider 410. The server 420 is any machine that distributes content provider 410 content on behalf of the content provider 410 and is not under the content provider 410 control.

The figure commences with the server 420 defining a security configuration for the content provider 410. To define the security configuration, the content provider 410 provides (at 450) a security certificate that the content provider 410 has obtained from the first certificate authority 440 to the server 420.

The server 420 performs (at 455) a hash of the SPKI included in the content provider 410 security certificate. The server 420 pins the hash result to the content provider 410. Pinning involves storing the hash result as the authority verification identifier for the content provider 410. Pinning identifies the first certificate authority as the certificate authority that issues the content provider 410 security certificates.

At some later time, the server 420 attempts to retrieve the content provider 410 content in order to redistribute the content to requesting users. The retrieval may be triggered in response to the server 420 receiving a user request for the content provider 410 content and the server 420 not having a locally cached copy of the content.

To retrieve the content provider 410 content, the server 420 sends (at 460) a request to the content provider 410. Unbeknownst to the server 420, the request or the content provider 410 response is intercepted by the attacker 430. The attacker 430 then submits (at 470) its own content along with a security certificate signed by the second certificate authority 445 fraudulently identifying the sender as the content provider 410. Since the second certificate authority 445 is a trusted certificate authority, the security certificate appears valid in every respect.

The server 420 performs certificate pinning to verify the certificate and certificate authority authenticity. First, the server 420 obtains the authority verification identifier pinned for the content provider 410 since the content provider 410 content is at issue. The server 420 hashes (at 480) the SPKI that is included with the received security certificate. The server 420 then compares (at 490) the hash result with the stored authority verification identifier for the content provider 410.

The server 420 detects fraudulent activity when the hashing result does not match the authority verification identifier that is pinned for the content provider 410. Specifically, the server 420 identifies that the certificate authority signing the certificate submitted with the received content (i.e., the second certificate authority 445) is different than the certificate authority that is identified to sign the content provider's 410 security certificates (i.e., the first certificate authority 440). Accordingly, even though the security certificate submitted with the received content verifies the sender's identity to be the content provider 410, the server 420 identifies the security certificate to be spoofed or fraudulent. In response, the server 420 rejects (at 495) the received content. The server 420 can take further ameliorative action including notifying the content provider 410 of the fraudulent activity, notifying the second certificate authority 445, and notifying any regulatory or law enforcement authorities.

Figure 5:
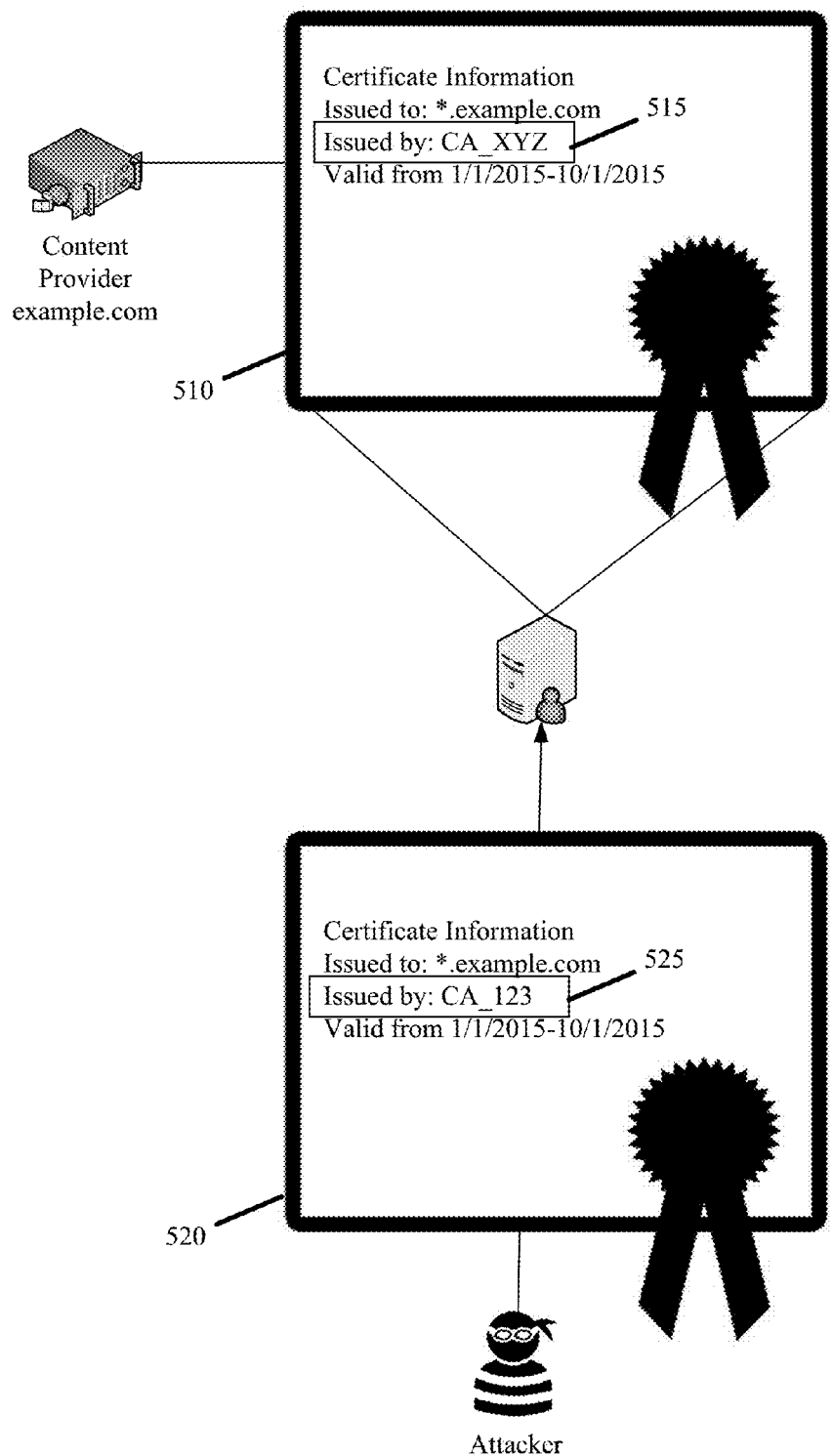
FIG. 5 illustrates certificate pinning using certificate authority names as the authority verification identifier in accordance with some embodiments.

FIG. 5 illustrates certificate pinning using certificate authority names as the authority verification identifier in accordance with some embodiments. The figure illustrates a particular content provider certificate 510 that the content distribution server obtains from the particular content provider as part of the particular content provider's security configuration. In some embodiments, the content distribution server stores a copy of certificate 510. This certificate 510 is issued by a first certificate authority 515. The figure also illustrates a second certificate 520 issued by a second certificate authority 525 that the content distribution server receives from an entity attempting to verify itself as the particular content provider. Both certificates 510 and 520 are issued by trusted certificate authorities 515 and 525. Both certificates 510 and 520 appear valid on the surface. However, because the content distribution server knows that only the first certificate authority 515 has issued the particular content provider security certificates and the issuing certificate authority name from the second certificate 520 is different, the content distribution server determines the second certificate 520 to be falsified or fraudulent and one that is being used to perpetrate fraudulent activity.

Some embodiments perform certificate pinning without involving certificate authorities. Some such embodiments use self-signed certificates. Self-signed certificates can be generated using any open source asymmetric cryptography algorithms or proprietary algorithms. A self-signed security certificate can be formatted the same or different than typical X.509 certificates. In some embodiments, the self-signed security certificate adheres to a content distributor defined format.

Figure 6:
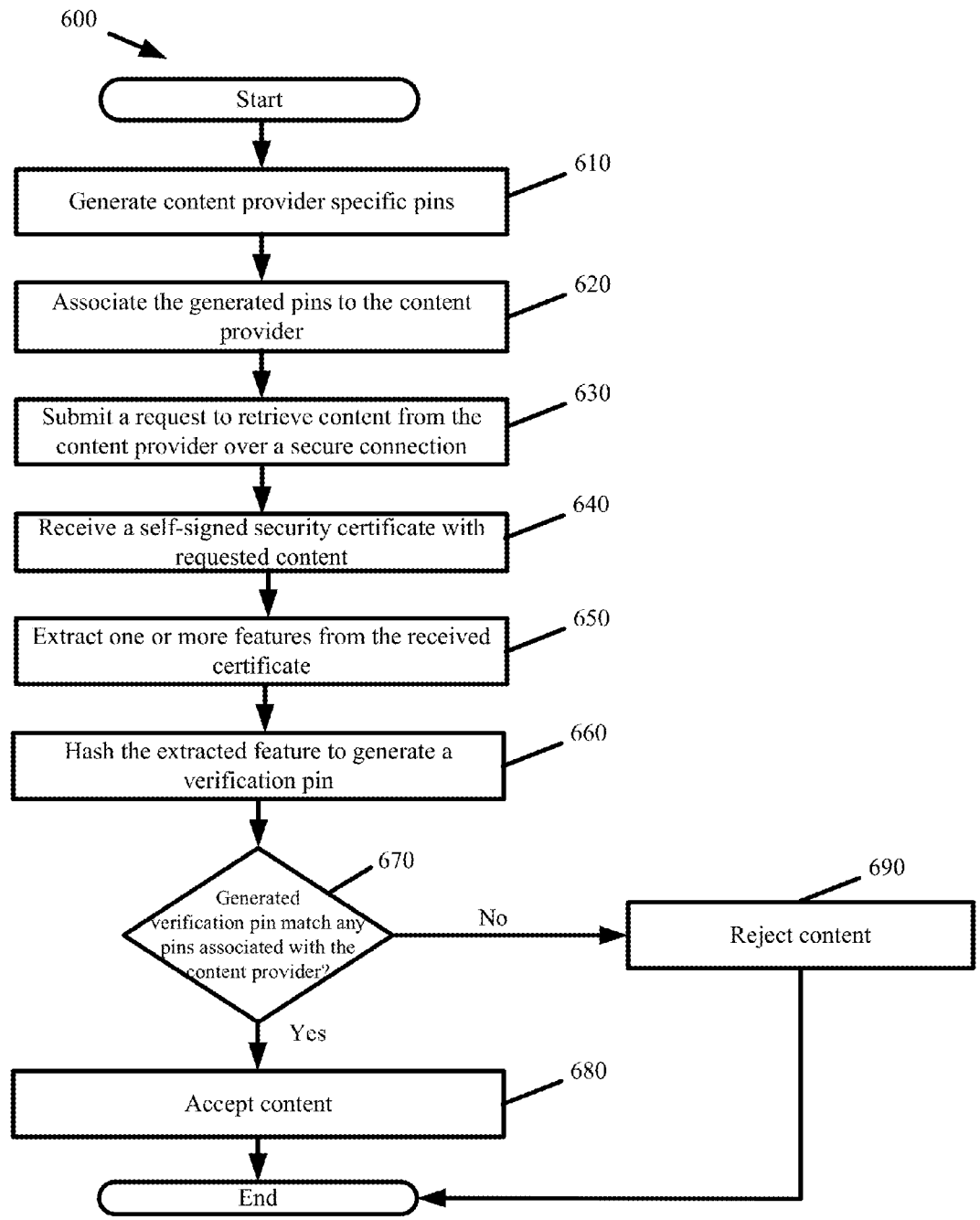
FIG. 6 presents a process for certificate pinning using self-signed certificates in accordance with some embodiments.

FIG. 6 presents a process 600 for certificate pinning using self-signed certificates in accordance with some embodiments. Process 600 begins at the time a content provider registers with a content distribution server or configures the content distribution service.

The process involves generating (at 610) content provider specific pins. A pin can be the result of hashing a feature of a content provider generated security certificate. In such cases, the content provider is the root authority and no other certificate authorities are in the certificate chain. Here again, the SPKI can be the hashed feature producing the content provider pin.

The process associates (at 620) the generated pins to the content provider. Associating the pins includes storing the pins as preconfigured authority verification identifiers on the server. For example, pins 1231, 2342, and 3429 are associated with content provider www.xyz.com.

At some point thereafter, the process submits (at 630) a request to retrieve content from the content provider over a secure connection. In return, the process receives (at 640) a self-signed security certificate and one or more packets encapsulating the requested content.

The process performs certificate pinning to verify authenticity and identity of the sender albeit without involving a certificate authority. To do so, the process extracts (at 650) one or more features from the received self-signed certificate. The process then hashes the extracted feature to generate (at 660) a verification pin. The process compares (at 670) the generated verification pin to the pins associated with the content provider. So long as attackers do not have access to the private keys from which the content provider generates the self-signed certificate, the attacker will be unable to generate a certificate that generates a pin that can be used to spoof the content provider's identity.

When the verification pin matches one of the stored pins, the content provider's identity is verified and the content is accepted (at 680) and trusted. When the pins do not match, the server detects the fraudulent activity and rejects (at 690) the received content. Other corrective action can again be taken.

Figure 7:
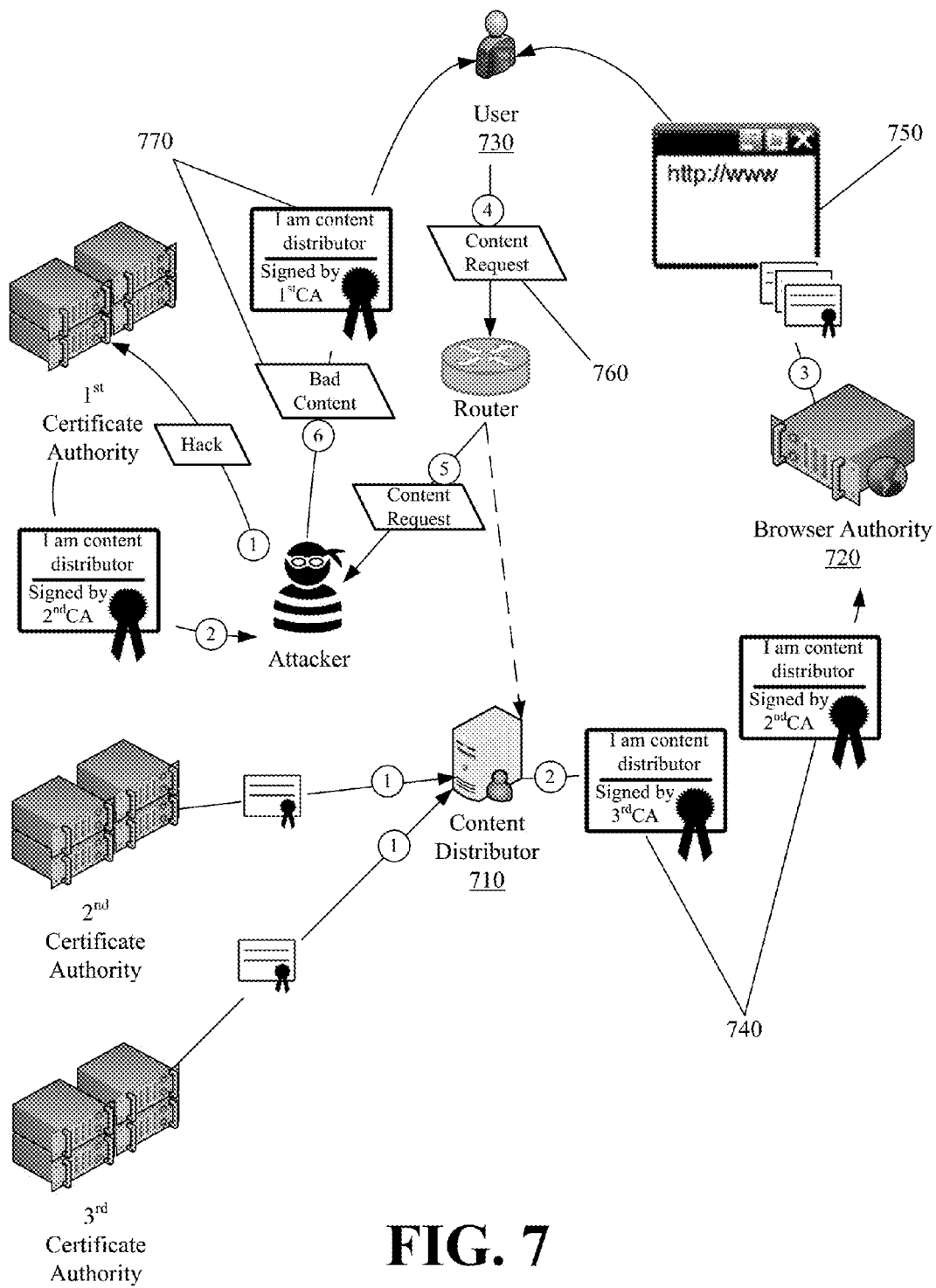
FIG. 7 conceptually illustrates configuring and performing certificate pinning for content that is passed from the content distributor to an end user in accordance with some embodiments.

The content distributor is also tasked with ensuring secure delivery of content provider content to end users. Stated differently, the content distributor not only ensures that the content it receives from content providers has not been altered, it also ensures that the content it passes to end users remains unaltered. Accordingly, the second end for the end-to-end certificate pinning embodiments set forth herein involves the configuring and performing certificate pinning for content provider content that the content distributor passes to end users. FIG. 7 conceptually illustrates configuring and performing certificate pinning for content that is passed from the content distributor to an end user in accordance with some embodiments.

The figure illustrates a content distributor 710, a browser authority 720, and an end user 730. As before, the content distributor 710 is tasked with distributing different content provider content to different end users. The content distributor 710 enables certificate pinning for the content it sends to end user 730 to ensure that the content distributor 710 passed content is not intercepted and substituted with content from an attacker prior to reaching the end user 730.

To facilitate certificate pinning for content passed to end users, the content distributor 710 requests that the browser authority 720 pin within its browser's pinset a list of certificate authorities that issue the content distributor 710 security certificates to the content distributor. This can include providing (at 740) the browser authority with the content distributor security certificates or names, domain names, etc. of the certificate authorities issuing the content distributor security certificates. The browser authority 720 is the entity developing and managing the distribution of a web browser, such as Chrome, Firefox, Safari, and Edge. In order to enter the content distributor 710 certificate authorities to the browser authority 720 pinset, the browser authority 720 will likely perform its own authentication of the content distributor 710 identity. Once verified, the browser authority 720 enters the certificate authorities that issue or sign the content distributor's security certificates as content distributor authority verification identifiers in the browser pinset.

The end user 730 downloads (at 750) or updates its browser from the browser authority 720. The browser copy includes the content distributor 710 authority verification identifier or list of certificate authorities issuing content distributor 710 certificates within its pinset.

When the user 730 requests (at 760) content from the content distributor 710 over a secure connection and receives (at 770) a security certificate and/or the requested content, the user 730 browser will inspect the content distributor 710 certificate to ensure that the certificate authority issuing the certificate is one of the identified content distributor 710 certificate authorities in the browser pinset. Specifically, the browser determines if the certificate is issued by a certificate authority that is identified in the browser pinset as a certificate authority known to issue content distributor 710 certificates. If not, the user 730 browser detects fraudulent activity and rejects the incoming content. Otherwise, the user 730 accepts and processes the content trusting that it is coming from the content distributor 710 and it has not been altered during delivery.

Although FIG. 7 illustrates performing certificate pinning at an end user browser, the same methodology can be applied to other means with which the end user can receive content from the content distributor. For example, the content distributor can configure the authority verification identifiers identifying which certificate authorities issue or sign the content distributor's security certificates into a mobile application or program. Thereafter, when the mobile application or program retrieves content from the content distributor (e.g., IP address, URL, domain name, etc.), the mobile application or program uses the configured content distributor authority verification identifiers to ensure that the content is coming from the content distributor and not an attacker representing itself as the content distributor.

Figure 8:
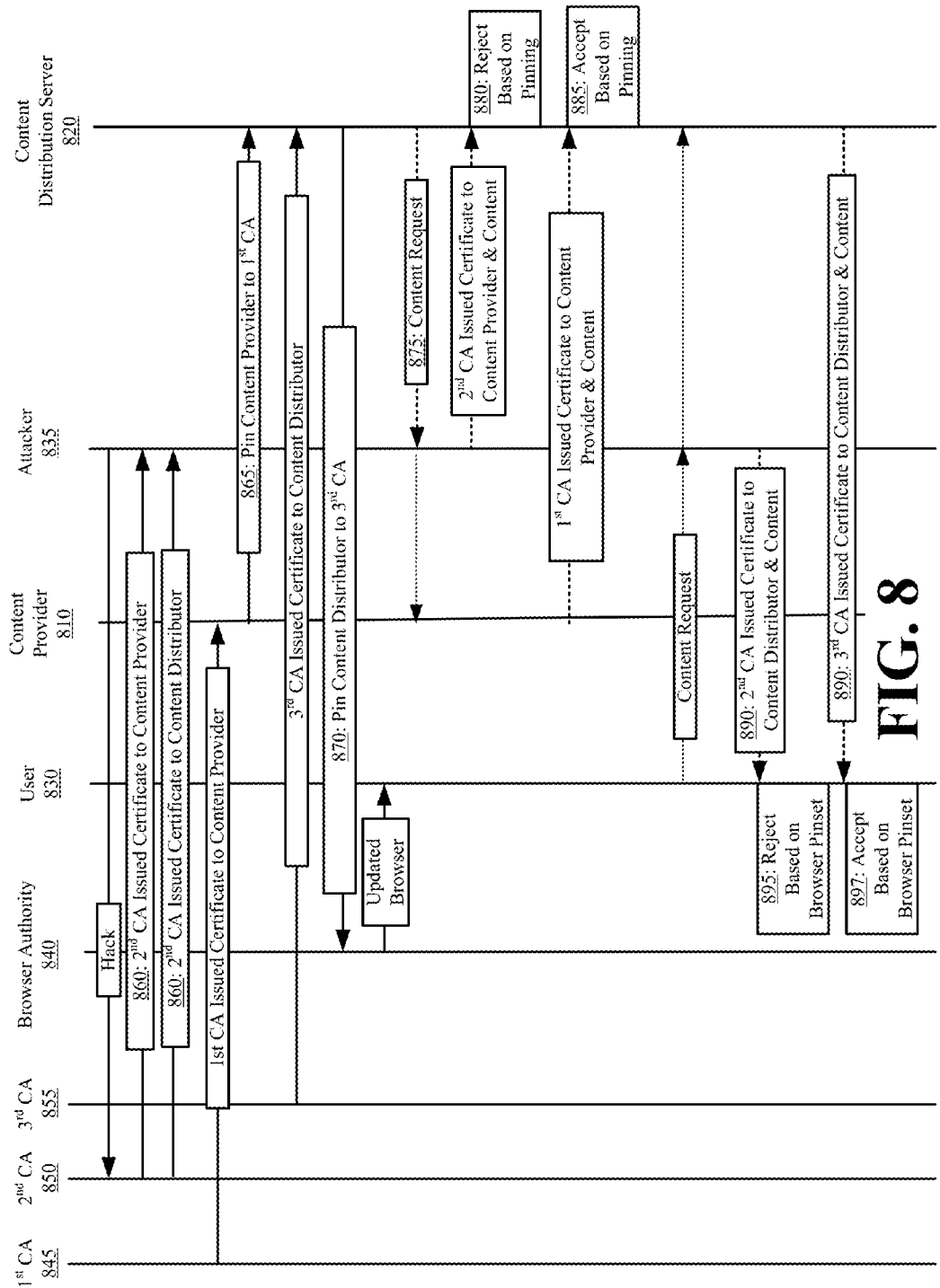
FIG. 8 provides a message exchange detailing the end-to-end certificate pinning of some embodiments.

FIG. 8 provides a message exchange detailing the end-to-end certificate pinning of some embodiments. The figure illustrates a content provider 810, a content distribution server 820, a user 830, an attacker 835, a browser authority 840, a first certificate authority 845, a second certificate authority 850, and a third certificate authority 855.

All certificate authorities 845, 850, and 855 may be trusted by the content distribution server 820 and user 830, but for the purposes of this figure, it is assumed that the second certificate authority 850 has been compromised by the attacker 835 such that the attacker 835 can have the second certificate authority 850 issue (at 860) certificates identifying the attacker 835 as either the content provider 810 or the content distribution server 820. The first certificate authority 845 issues or signs the content provider 810 security certificates. The third certificate authority 855 issues or signs the content distribution server 820 security certificates.

The content provider 810 provides content for the content distribution server 820 to deliver on its behalf to different users including user 830. Accordingly, the content distribution server 820 is tasked with ensuring secure retrieval and delivery of the content provider 810 content.

To ensure secure retrieval of the content from the content provider 810 to the content distribution server 820, the content distribution server 820 pins (at 865) the content provider 810 to the first certificate authority 845 based on the content provider 810 identifying the first certificate authority as its certificate originator or providing its issued security certificate to the content distribution server 820.

To ensure secure delivery of the content provider 810 content from the content distribution server 820 to the user 830, the content distribution server 820 requests (at 870) that the browser authority 840 pin the content distributor to the third certificate authority 855 and enter this information to the browser pinset. Accordingly, when the user 830 obtains the browser with the updated pinset, the browser will only accept content from the content distribution server 820 when the content is submitted with a security certificate issued by the third certificate authority 855.

In response to requesting (at 875) the content provider 810 content, the content distribution server 820 receives security certificates from the content provider 810 and the attacker 835. Both certificates identify the certificate sender to be the content provider 810 and both certificates appear valid and are issued by trusted certificate authorities. However, since the attacker 835 certificate is issued by the second certificate authority 850 and the content distribution server 820 has pinned the content provider 810 to the first certificate authority 845, the content distribution server 820 detects the incorrect issuing certificate authority 850 and rejects (at 880) any content from the attacker 830. The certificate passed by the content provider 810 is issued by the correct first certificate authority 845. Accordingly, the content distribution server 820 accepts (at 885) the content from the content provider 810.

Similarly, in response to requesting content from the content distribution server 820, the user 830 receives (at 890) security certificates from the content distribution server 820 and the attacker 835. Here again, both certificates identify the certificate sender to be the content distribution server 820 and both certificates appear valid and are issued by trusted certificate authorities. However, since the attacker 835 certificate is issued by the second certificate authority 845, the user 830 browser, based on the preconfigured browser pinset pinning the content distributor (and thereby the content distribution server 820) to the third certificate authority 855, detects the incorrect issuing certificate authority 850 and rejects (at 895) any content from the attacker 835. The certificate passed by the content distribution server 820 is issued by the correct third certificate authority 855. Accordingly, the user 830 browser accepts (at 897) the content from the content distribution server 820.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 9:
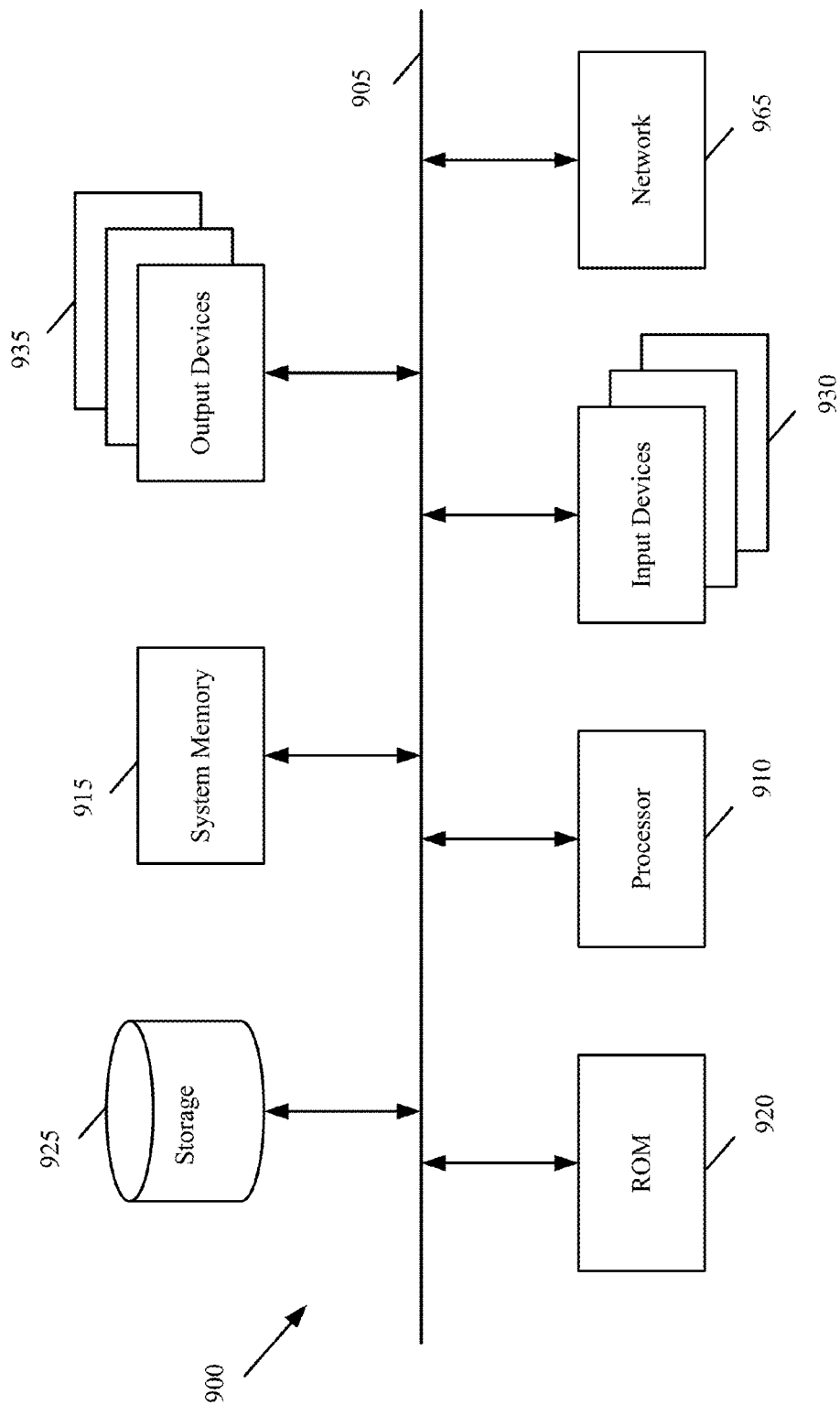
FIG. 9 illustrates a computer system or server with which some embodiments are implemented.

FIG. 9 illustrates a computer system or server with which some embodiments are implemented. Such a computer system includes various types of computer-readable mediums and interfaces for various other types of computer-readable mediums that implement the various methods and machines described above (e.g., content distribution server). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices. The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
  establishing a first content provider as a valid originating source of first content for a content distribution server by pinning at the content distribution server, the first content provider to a first certificate authority of a plurality of certificate authorities, wherein each of the plurality of certificate authorities issues security certificates verifying identity of different content providers, and wherein the first certificate authority issues one or more security certificates verifying identity of the first content provider;
  receiving at the content distribution server in response to a request for first content of the first content provider, second content with a security certificate issued by one of the plurality of certificate authorities, wherein said security certificate verifies said second content as originating from the first content provider;
  accepting said second content at the content distributor as an original copy of the first content based on (i) identifying an originating certificate authority of the security certificate received with said second content and (ii) matching said originating certificate authority to the first certificate authority set as the issuing certificate authority for the first content provider as a result of said establishing and pinning; and
  rejecting said second content at the content distributor in response to detecting interception of said request by an attacker impersonating the first content provider and the second content to be a fraudulent or altered copy of the first content, wherein said detecting comprises determining a mismatch between the originating certificate authority issuing the security certificate received with said second content and the first certificate authority set as the issuing certificate authority for the first content provider as a result of said establishing and pinning.

2. The method of claim 1, wherein said pinning identifies the first certificate authority as a source that successfully verified identity of the first content provider.

3. The method of claim 2 further comprising modifying a pinset of at least one user browser, wherein said modifying comprises adding a third certificate authority of the plurality of certificate authorities as a source that has successfully verified identity of the content distribution server distributing said content on behalf of the first content provider.

4. The method of claim 3, wherein said modifying of the pinset causes the user browser to accept content from the content distribution server provided with a security certificate identifying the third certificate authority, and rejecting content from the content distribution server provided with a security certificate identifying a certificate authority other than the third certificate authority.

5. The method of claim 1, wherein said pinning comprises linking one of the first certificate authority's name, canonical name, and domain name to the first content provider.

6. The method of claim 1 further comprising differentiating between issuance of the security certificate from the first certificate authority and the second certificate authority from hashing a security certificate feature of said security certificate.

7. The method of claim 6, wherein said security certificate feature is the subject public key information (SPKI).

8. The method of claim 1, wherein accepting said second content comprises hashing the SPKI of the security certificate and accepting the second content in response to a result of said hashing matching a first identifier from said pinning.

9. The method of claim 1, wherein accepting said second content comprises caching a copy of the second content and redistributing the cached copy in response to a user request for the first content.

10. The method of claim 1 further comprising pinning a different second content provider to a third certificate authority of the plurality of certificate authorities.

11. The method of claim 10 further comprising accepting content issued with a third security certificate verifying content origination from the second content provider when the third security certificate is issued by the third certificate authority.

12. A method for performing end-to-end certificate pinning by a content distributor distributing content on behalf of a particular content provider to different clients, the method comprising:
  securing end-to-end delivery of said content over a first path between the particular content provider and the content distributor by pinning at the content distributor, the particular content provider to a first certificate authority of a plurality of certificate authorities, wherein pinning the particular content provider comprises configuring a first identifier identifying the first certificate authority as the certificate authority issuing a security certificate to the particular content provider;

securing end-to-end delivery of said content over a second path between the content distributor and the different clients by pinning within a client browser of the different clients, the content distributor to a different second certificate authority of the plurality of certificate authorities, wherein pinning the content distributor comprises modifying a pinset of said client browser with a second identifier identifying the second certificate as the certificate authority issuing a content distributor security certificate;

submitting from the content distributor, a request for content of the particular content provider;

receiving in response to said request at the content distributor, the content with a first security certificate; and providing secure end-to-end delivery of said content from the particular content provider to a client requesting said content from the content distributor with said client browser, wherein said providing comprises:

(i) forwarding the content with a different second security certificate comprising the second identifier to said client in response to said content distributor receiving said content with the first security certificate comprising an identifier matching the first identifier pinned for the particular content provider at the content distributor, wherein said identifier matches the first identifier when the first certificate authority pinned to the particular content provider issues the first security certificate accompanying the content, and (ii) rejecting the content in response to said receiving providing the first security certificate with an identifier not matching the first identifier pinned for the particular content provider, wherein said identifier does not match the first identifier when a certificate authority other than the first certificate authority pinned to the particular content provider issues the first security certificate accompanying said content.

13. The method of claim 12, wherein configuring the first identifier comprises receiving the first identifier from the particular content provider.

14. The method of claim 12, wherein configuring the first identifier comprises receiving a security certificate from the particular content provider in advance of submitting said request, and generating the first identifier by hashing a feature of said security certificate.

15. The method of claim 14, wherein said feature is the security certificate SPKI.

16. The method of claim 12 further comprising detecting the first security certificate to be fraudulently issued when the first security certificate omits the first identifier.

17. The method of claim 16, wherein said detecting comprises hashing data in the first security certificate and comparing a result of said hashing with the first identifier.

18. A method for securing content distributor delivery of first content originated by a content provider, the method comprising:

generating a self-signed first security certificate at the content provider with a private key of the content provider, wherein said self-signed first security certificate is different than security certificates issued by a plurality of certificate authorities;

configuring at the content distributor, a first set of identifiers obtained from said self-signed first security certificate of the content provider, wherein the first set of identifiers verifies the content provider as the originator of said self-signed first security certificate;

receiving at the content distributor in response to a request for said first content from the content provider, second content with a second security certificate verifying said second content as originating from the content provider;

accepting said second content in response to detecting the second content to be an original copy of the first content based on a second set of identifiers obtained from the second security certificate received with said second content matching the first set of identifiers obtained from the self-signed first security certificate; and rejecting said second content in response to detecting the second content to be a fraudulent or altered copy of the first content based on the second set of identifiers obtained from the second security certificate received with said second content being mismatched with the first set of identifiers obtained from the self-signed first security certificate.

19. The method of claim 18, wherein configuring the first set of identifiers comprises producing the first set of identifiers from hashing at least one feature of the self-signed first security certificate, and wherein accepting and rejecting said second content comprises producing the second set of identifiers from hashing the feature from the second security certificate received with said second content.

* * * * *